United States Patent [19]

Mis

[11] Patent Number: 5,453,615
[45] Date of Patent: Sep. 26, 1995

[54] SYSTEM FOR RADIOGENIC DETECTION AND ANALYSIS OF MICROSCOPIC FLAWS IN THE SURFACE STRUCTURE OF SOLID OBJECTS

[75] Inventor: Frederic J. Mis, Webster, N.Y.

[73] Assignee: Rochester Gas & Electric, Rochester, N.Y.

[21] Appl. No.: 184,817

[22] Filed: Jan. 21, 1994

[51] Int. Cl.$^6$ .............................. G01T 1/161; G21H 5/02
[52] U.S. Cl. ........................................ 250/303; 250/370.1
[58] Field of Search ................................... 250/303, 302, 250/370.1

[56] References Cited

U.S. PATENT DOCUMENTS

| | | | |
|---|---|---|---|
| 90,331 | 4/1949 | Linder | 250/303 |
| 3,299,269 | 1/1967 | Hanson et al. | 250/303 |
| 3,890,959 | 6/1975 | Youdin et al. | 128/2.05 F |
| 4,454,422 | 6/1981 | Persyk | 250/363 S |
| 4,791,300 | 12/1988 | Yim | 250/363 R |
| 4,982,327 | 1/1991 | Habara et al. | 250/363.01 |
| 5,057,690 | 10/1991 | Morgan et al. | 250/370.01 |

Primary Examiner—Bruce C. Anderson
Attorney, Agent, or Firm—M. Lu Kacher

[57] ABSTRACT

An improved system for detection and analysis of microscopic flaws in objects such as high-speed turbine blades collimates the gamma radiation emanating from flaws in an object treated with a radioactive gas, preferably xenon-133, to form a gamma-photon virtual image of a surface of the object showing flaws therein. A scintillation plate transforms the gamma-photon virtual image into a photoelectron virtual image. A chevron microchannel plate pair (MCP) multiplies the number of electrons comprising the photoelectron virtual image by a factor of at least $10^5$. The multiplied photoelectron virtual image can be converted to visible output information relatable to the flaws in the object by directing it onto a phosphor-coated plate. The scintillator, microchannel plate multiplier, and phosphor plate are contained in a housing shielded with lead to screen out signal noise from cosmic radiation. The housing is subjected to a pressure of about $10^{-7}$ Torr. Electromagnetic fields within the housing drive photoelectrons carrying the virtual image from the scintillator through the microchannel plate multiplier and into the phosphor plate, creating the visible image showing the flaws. The visible image can be viewed or photographed through a window in the rear of the housing, or it can be digitized by a video translator such as a charge-coupled device (CCD) camera for computerized image analysis. Alternatively, if output information in the form of a digitized image or data printout is desired, the phosphor plate can be omitted and the multiplied photoelectron virtual image can be digitized directly by the translator.

33 Claims, 5 Drawing Sheets

SYSTEM FOR RADIOGENIC DETECTION AND ANALYSIS OF MICROSCOPIC FLAWS IN THE SURFACE STRUCTURE OF SOLID OBJECTS

FIELD OF THE INVENTION

The present invention relates to a system (method and apparatus) for detection of flaws in objects, particularly in the surface structure of working parts, and more particularly to detection of stress flaws in fatigued parts such as, for example, the blades of turbines which have been subjected to extended service times.

BACKGROUND

High speed turbines are subject to failures which can be catastrophic to jet airplane engines and power plant electrical generators in which such turbines are used. Because turbines often are required to function for prolonged periods of time under conditions of high temperature, high pressure, and high stress, the blades of such turbines are vulnerable to progressive stress fracturing as a result of the loads imposed.

Stress fractures in turbine blades, also commonly known as flaws, in their early stages can be virtually microscopic in size. They can be invisible to visual inspection and can penetrate some distance into the blade from its surface, sometimes at a sharp angle, with only a tiny fissure at the surface. Flaws occur most commonly at the root of a blade, where flexural stress is at a maximum, but can also occur in other areas of a blade. Catastrophic failure of blades can be prevented if stress fractures are detected while still small, allowing replacement of defective blades. If permitted to grow, however, a stress fracture can lead to breaking of a blade resulting in catastrophic failure of the entire turbine.

In the case of a nuclear power plant electrical generator, such failure can be disastrous. Failure of a jet airplane engine in flight can also lead to disaster. For this reason, government and industry regulations have been established requiring the periodic inspection and testing of turbine blades.

There are numerous non-destructive examination (NDE) approaches to detecting flaws in objects. One of the oldest is x-ray imaging, in which the object to be tested is irradiated with x-rays, and variations in transmitted intensity are recorded, usually on photographic film. Voids in the object typically transmit more radiation and thus can be seen as dark areas on the film. This approach has difficulty in detecting the very small fissures typical of blade fatigue.

Another approach is the use of eddy currents to find discontinuities in metals, indicative of stress flaws. While this technique in principle is sensitive enough to find blade fatigue flaws, it requires constant adjustment of the signal and associated calibration jigs, and presents difficulty in correlation of an error signal to the location of a flaw. This technique also cannot be used on blades formed of non-conducting materials.

Another approach is to coat the surface of a ferromagnetic test object with very fine magnetic particles. Surface cracks are shown as areas in which such particles are not retained. Sub-surface cracks generally are not detected. This approach requires the test object to be ferromagnetic, which most turbine blade alloys are not, and thus magnetic NDE will not work on such blades.

Still another approach is to treat the test object with a radioactive gas. Flaws or voids in the object become filled with the gas, and subsequently a pattern of atomic particles radiating from the object can be evaluated to find such flaws or voids. Several such methods have the common goal of imaging the radiation emanating from a treated object and making that image visible.

U.S. Pat. No. 3,499,319, issued Mar. 10, 1970 to Figueroa, describes a method for treating an object with radioactive krypton gas (Kr-85) and then exposing the object to photographic film for up to three days to detect radiation emanating from voids in the object.

U.S. Pat. No. 3,621,252, issued Nov. 16, 1971 to Eddy, involves the use of a fiber optics bundle in detection of flaws by radioautography. The ends of the fibers are coated with a phosphor which emits light when exposed to sufficient radiation. These ends are exposed to a video camera, and the video signals are electrically amplified and used to provide a television picture of the image formed at the end of the fiber bundle.

U.S. Pat. No. 3,891,844, issued Jun. 24, 1975 to Gibbons, discloses the use of a photographic emulsion liquid coated and then chill-set on the surface of a test object previously treated with Kr-85. The emulsion is supposed to seal the residual krypton gas in the flaws and become photographically exposed in areas of high radioactivity. The exposure pattern is made visible by photographic development of the coated object.

Krypton-85 is the gas of choice in the foregoing radiation-detecting methods. Its advantages are that it is an unreactive gas having a relatively small molecular diameter of approximately 3 μm, and therefore able to penetrate extremely narrow fissures. Its drawbacks are a relatively long half-life of ten years and its low-energy beta emission. The long half-life results in a low specific activity and therefore a relatively low signal strength. Its beta emission is capable of penetrating most metal objects only a small distance and therefore radiation from relatively deep fissures is highly attenuated and not reliably detected by the above methods.

SUMMARY OF THE INVENTION

It is an object of the invention to provide an improved system which will rapidly and nondestructively detect and image subsurface flaws in an object regardless of its ferromagnetic properties and without resort to special coatings; which can amplify a radiation image emanating from an object prior to conversion of the radiation image to a visual image; and which provides output information easily and reliably relatable to the actual locations of flaws in the object.

Briefly described, an improved detection and analysis system, in accordance with the presently preferred embodiment of the invention, collimates the image-forming portion of the gamma radiation emanating from flaws in an object which has been treated with a radioactive gas, preferably xenon-133, thereby forming a gamma photon virtual image of the flaws in the object. As herein defined, gamma photons and gamma particles are equivalent names for gamma atomic radiation. A scintillation plate transforms the gamma photon virtual image into a photoelectron virtual image. A chevron microchannel plate pair (MCP) multiplies electro-optically the number of photoelectrons carrying the virtual image by a factor of at least $10^5$. The highly-multiplied photoelectron virtual image can be converted to visible output information relatable to flaws in the object by directing it onto a phosphor-coated plate. The scintillator, microchannel plate multiplier, and phosphor plate are contained in a housing shielded with lead to screen out signal noise from cosmic radiation. Since electron multiplication without scattering requires a vacuum, the housing is subjected to a pressure of about $10^{-7}$ Torr to permit in-vacuum operation of the MCP. Electromagnetic fields within the housing drive photoelectrons comprising the virtual image from the scintillator through the MCP and into the phosphor plate, creating a visible image of the flaws in the object's surface structure (on and under the surface). The visible image can be viewed or photographed through a window in the rear of the housing, or it can be digitized by a video translator, preferably a charge-coupled device (CCD) camera, for digital image analysis. Alternatively, if output information in the form of a digitized image or data printout is desired, the phosphor plate can be omitted and the multiplied photoelectron virtual image can be digitized directly by the translator.

BRIEF DESCRIPTION OF THE DRAWINGS

The foregoing and other features, objects, and advantages of the invention will become more apparent from a reading of the following description in connection with the accompanying drawings in which.

DETAILED DESCRIPTION OF THE INVENTION

Figure 1:
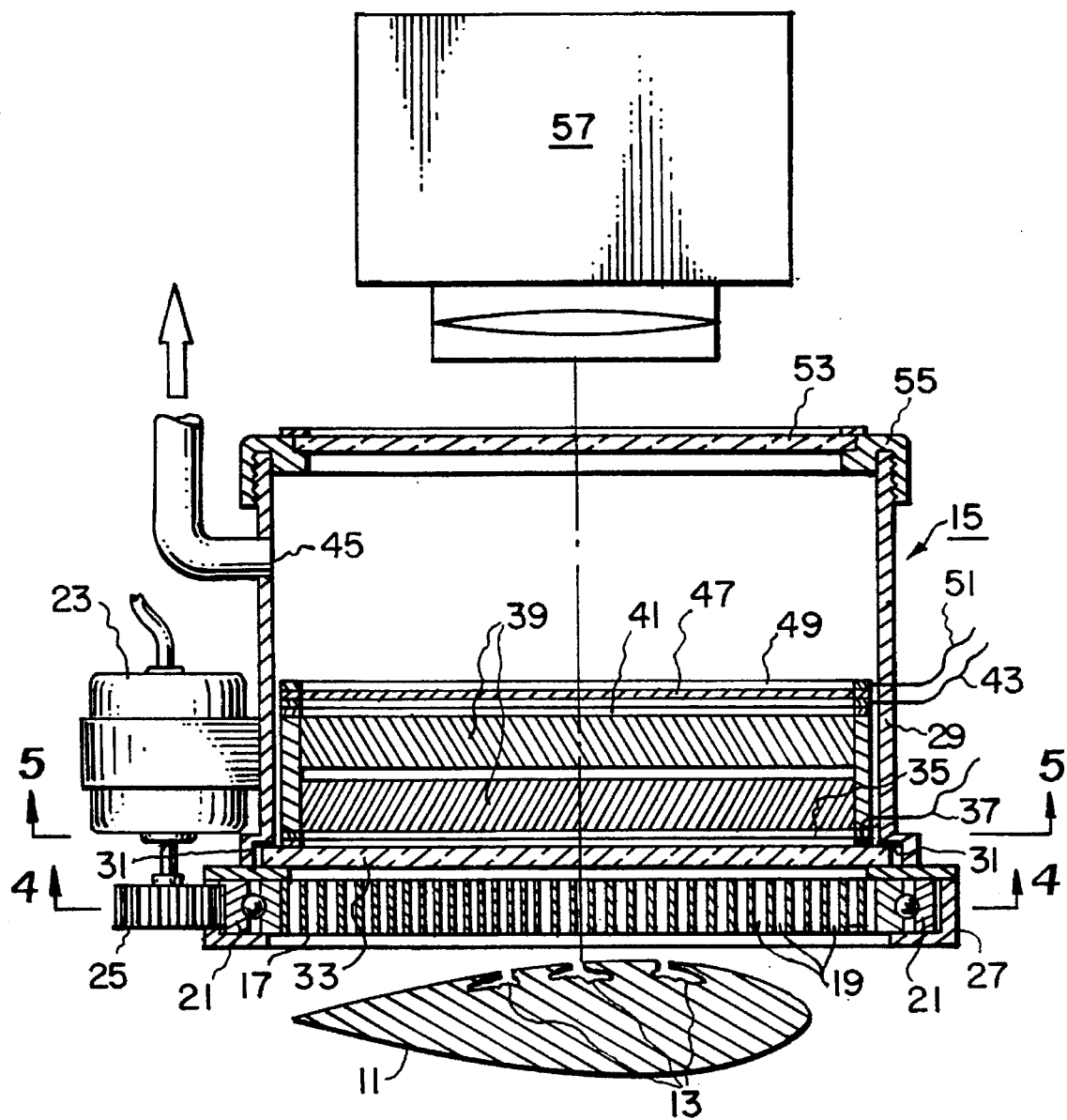
FIG. 1 is a side view in vertical cross-section (the section being taken along line 1—1 in FIG. 4) of a presently preferred embodiment of the invention in working position to detect flaws in a turbine blade, showing a camera to photograph images of flaws on a phosphor-coated plate.

Referring to the drawings in which like numbers indicate like parts, and particularly to FIG. 1, there is shown a solid object under test in the form of a turbine blade 11. The blade has several flaws 13 in its upper surface structure. Blade 11 has been treated with a gas mixture comprising a radioactive isotope of a noble gas, preferably xenon-133, as described hereinbelow whereby an amount of radioactive gas has been forced into the flaws 13. Although this gas will eventually diffuse out of the flaws, for a useful period of time after treatment, for example, several days, the radiation from atomic decay of the gas in the flaws is sufficiently intense to be detected in determining the size and location of flaws in turbine blade 11.

The radiation to be detected from the preferred isotope, xenon-133, is gamma photons at an energy of approximately 81 KeV and an intensity of 36%. Previous radiogenic detection methods have relied on krypton-85, which has a principal emission of beta particles at 687 Kev at an intensity of 0.99%, and virtually no gamma emissions. The gamma photons of Xe-133 are far more energetic and far more numerous than the gamma photons of Kr-85. Radiation emanating from subsurface fissures is attenuated by the overlying material of the test object. Since Xe-133 gamma is far more penetrative than Kr-85 beta, a system designed around the use of Xe-133 can detect much smaller and deeper flaws than can a system designed around Kr-85.

Figure 4:
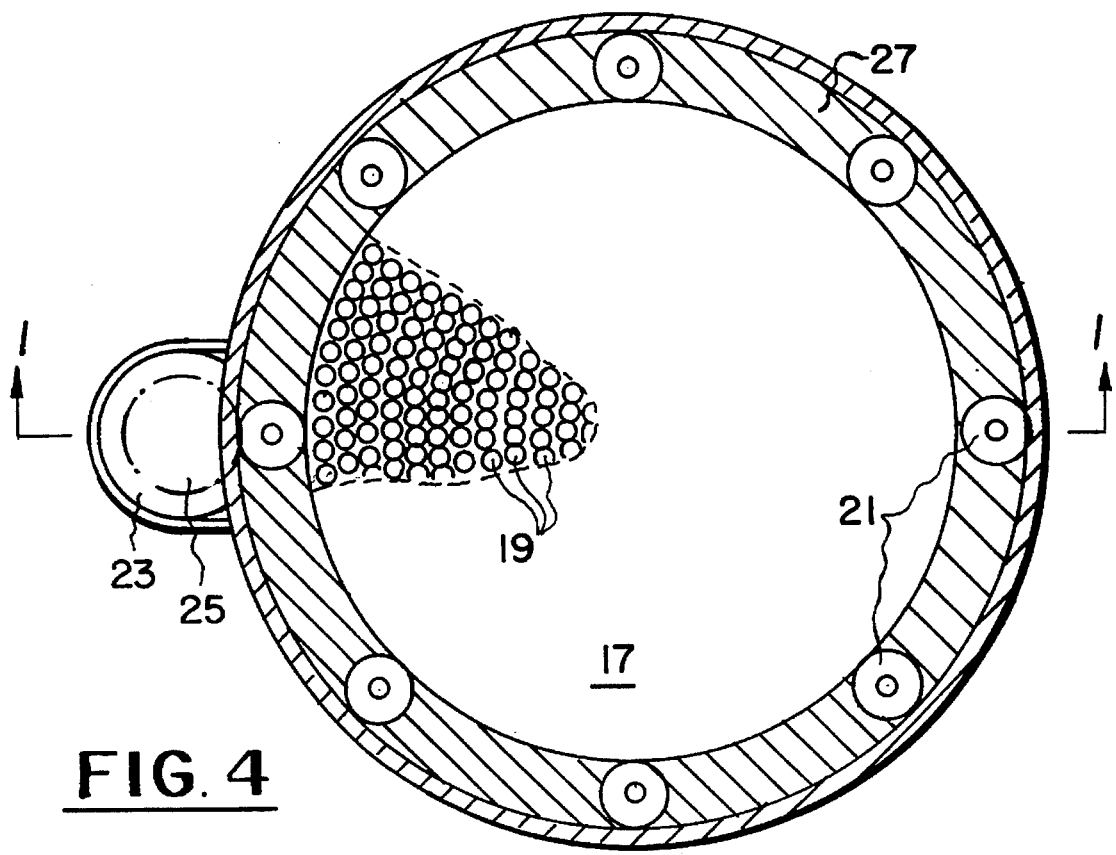
FIG. 4 is a cross-sectional view taken along line 4—4 in FIG. 1, showing a gamma-photon collimator and a drive to rotate the collimator.

Detection system 15 which makes practicable the detection of even weak radiation from small flaws is disposed immediately adjacent to blade 11. System 15 comprises a generally cylindrical housing 29 having a vertical axis and made of or surfaced with a radiation-absorbing material such as lead about 6 mm thick. This shielding is required to prevent cosmic radiation from penetrating the housing and creating electronic noise. Radiation from the gas decaying in flaws 13 emanates in all directions, including substantially coaxially with system 15. A gamma photon virtual image of the surface of blade 11 can be created between blade 11 and system 15 if all gamma photons but those travelling substantially coaxially with system 15 are screened out. It is important to prevent substantially off-axis photons from being detected as their detection would degrade the resolution of the final image of the blade surface. This discrimination is accomplished by parallel-hole lead plate collimator 17 disposed at the bottom of housing 29. Collimator 17 comprises a circular lead plate preferably about 5 mm in thickness with a hexagonal pattern of, preferably, round holes 19 each about 1 mm in diameter over its entire surface, as shown in FIG. 4. Holes 19 are as closely spaced as can be conveniently machined, with wall thicknesses typically of about 0.5 mm. The ratio of hole diameter to plate thickness is such that only those gamma photons travelling substantially normal to the collimator (within about 11° of normality) will pass through the plate, all other photons being absorbed by the lead. Other thicknesses of lead can be used. Thicker plates will provide greater collimation and discrimination of photons but at a cost of reduced signal strength. This collimative screening of gamma photons results in a virtual image of the flaws in blade 11 existing in space immediately above collimating plate 17. Because the lead of collimating plate 17 is opaque to gamma photons, flaws beneath the non-hole areas will not be detected unless plate 17 is moved during examination so that all areas of the field in blade 11 are equally exposed to holes 19. Therefore, as shown in FIGS. 1 and 4, plate 17 is surrounded radially by cylindrical bearings 21. Low-speed motor 23 is coupled to drive wheel 25 which impinges on the periphery of plate 17, the motor speed and wheel diameter being selected to cause plate 17 to complete one full rotation in about one minute, the length of time of a typical exposure. Plate 17 and associated bearings 21 are captured by an extension 27 of lead-shielded housing 29.

Mounted against a sealing gasket in a recess 31 in the open lower end of housing 29 above plate 17 is scintillating plate 33, which absorbs the axially-travelling gamma photons reaching its lower surface through holes 19 in collimating plate 17 and proportionally emits photoelectrons from its upper surface, thereby converting the incident gamma photon virtual image of flaws in blade 11 into a photoelectron virtual image immediately above scintillating plate 33 and within housing 29. Quartz, sodium iodide, and polystyrene are suitable scintillating materials for use as plate 33. A suitable quartz plate is a BK-7 window available from ESCO Products, Inc., Oak Ridge, N.J., USA. Plate 33 also serves as a sealing element in housing 29, which is evacuated in operation as described hereinbelow.

Within housing 29 and immediately adjacent to scintillating plate 33 is ring-shaped grounded electrode (cathode) 35 with its electrical lead 37 through the wall of housing 29, as shown in FIGS. 1 and 4. Above cathode 35 and insulated from it are a chevron pair of microchannel plates (MCP) 39. Above MCP 39 is insulated ring-shaped first anode 41 which also has a lead 43 through the wall of housing 29. Leads 37 and 43 are connected across a power source (not shown) which maintains a field of about +1000 volts DC between cathode 35 and first anode 41. In passing through MCP 39, the photoelectrons constituting the virtual image of the surface of blade 11 are multiplied in number by a factor of up to $10^8$.

Figure 5:
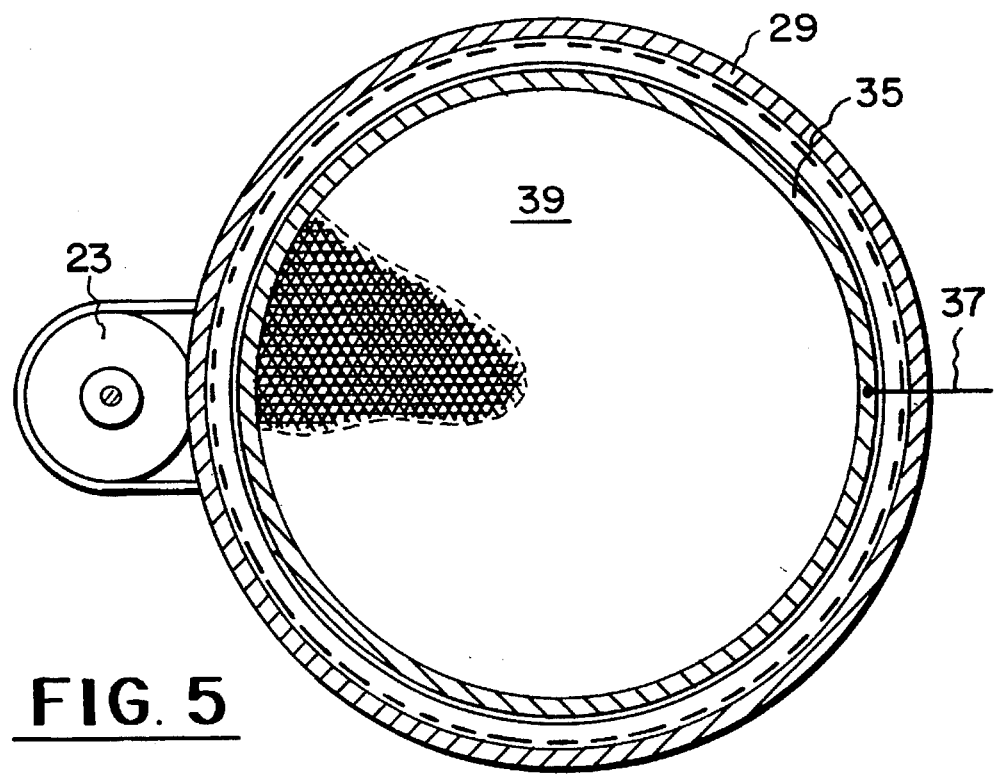
FIG. 5 is a cross-sectional view taken along line 5—5 in FIG. 1 through a grounded electrode, showing the lower surface of the microchannel plate multiplier.

As disclosed by E. L. Dereniak and D. G. Crowe in "Optical Radiation Detectors," John Wiley & Sons, 1984, pp. 123–126 a microchannel plate is an array of individual microchannels, or microscopic tubes, formed in a plate of specially-formulated glass. Each individual microchannel is capable of taking in a photoelectron at one end and discharging an enormously multiplied cascade of secondary photoelectrons from its other end through repeated collisions and further secondary emissions of electrons with the channel walls during passage through the microchannel. The composition and resistivity of the glass is chosen such that a minimum of two secondary electrons are ejected for each electron/wall collision. Electrons are driven through the MCP by the field imposed across its lower and upper surfaces between ground cathode 35 and first anode 41. Typical physical dimensions for such an array include an overall diameter of up to about 75 mm, a thickness or channel length of about 1 mm, and channel diameters in the range of 8–20 μm. Thus a microchannel plate can have as many as 107 or more individual microchannels, each one producing a single intensified picture element, or "pixel," in an imaging system. The microchannels are typically packed hexagonally in a plate, as shown in FIG. 5. Multiplication of about 108 can be achieved by using two plates in series, as in embodiment 15, although spatial resolution of the image may be reduced by half by image spreading between the two plates. Amplification of at least about $10^5$ is needed to detect subsurface flaws which emit weakly the collimated portion of the radiation. Collision of entering photoelectrons with the channel walls is assured by canting the microchannels a few degrees from axial, as shown in FIG. 1, giving rise to a "chevron" relationship between the two plates.

Because of the tiny passages and high electron densities present in a microchannel plate, an MCP can be energized only in a high vacuum. Otherwise the plate can be seriously damaged or destroyed. In system 15, a vacuum port 45 is provided in housing 29 and is connected through a shut-off valve and disconnect (not shown) to a high vacuum pump (not shown) such as a TSH 060 Turbomolecular Pump Station, available from Balzers High Vacuum Products, Hudson, N.H., USA. The interior of housing 29 is maintained at a pressure of about $10^{-7}$ Torr.

Above ring-shaped first anode 41 are phosphor-coated plate 47 and ring-shaped second anode 49 with its external lead 51, as shown in FIG. 1. Phosphor plate 47 is coated with a bright, short-lived phosphor such as P-22. Leads 43 and 51 are connected to an external power source (not shown), such as a Series 225 high voltage power supply available from Bertan High Voltage, Hicksville, N.Y., USA, and a field of +4000 volts DC is maintained between first anode 41 and second anode 49. This field accelerates the electrons comprising the highly-multiplied photoelectron virtual image being discharged from the upper surface of MCP 39 such that the phosphor on plate 47 fluoresces, providing thereby a visible image of the flaws in blade 11 which can be observed or can be photographed by camera 57 through window 53 in cap 55 which closes housing 29. Because blade 11 has been treated with high-energy gamma-emitting xenon-133 instead of lower-energy beta-emitting krypton 85, and because the virtual image is multiplied by many orders of magnitude by a microchannel plate pair before it is converted to a visible image, many more flaws and much smaller flaws can be detected by system 15 than would be possible with previous radiogenic detection systems.

A microchannel plate system which responds well to the photon energy of xenon-133 and which comprises a pair of chevron microchannel plates, a phosphor-coated plate, and the appropriate electrodes and leads as described hereinabove is available from Galileo Products, Sturbridge, Mass., USA.

Increasing the intensity of the radiation signal by multiplying the number of electrons carrying the photoelectron virtual image prior to recording it or displaying it visibly makes possible the imaging of small surface and subsurface flaws from which the radiation is too weak to provide a resolvable image directly. Such flaws may be, for example, less than $5 \times 10^3$ μm in volume. This permits detection of radiation signals from such small flaws which are far weaker than can be detected by other known methods, and therefore permits identification of stress flaws which are very small and which contain very little radioactive gas. For example, the detection method of Gibbons supra relies on the sensitivity of a photographic emulsion to accumulate atomic photons over a prolonged period of time, and very tiny fissures emitting very small signals may not be detected at all. The detection method of Eddy supra depends on his apparatus' acquiring directly a radiation signal of intensity sufficient to cause a phosphor to glow, and again, very tiny fissures may not be detected. Because of the electron multiplying capability of its microchannel plate pair, system 15 is capable of detecting flaws many times smaller (because such flaws emit signals many times weaker) than can be detected by other known methods. The microchannel pixilation of image information noted hereinabove also is compatible with extremely small flaws, as small as, for example, 50 μm in length.

The use of xenon-133 gas also provides for improved imaging of small flaws. Xenon-133 is superior to krypton-85 in two important respects. First, it has a half-life of 5.3 days, thereby providing a rate of atomic decay approximately 700 times greater than that of krypton-85, with a correspondingly larger signal. Second, it emits principally gamma photons which, as previously noted, are highly penetrative of materials, whereas krypton-85 emits principally beta particles which are far less penetrating. The 70 KeV gamma photons of xenon-133 are energetically well matched to the receptive characteristics of the described MCP multiplier. Because of its short half-life, xenon-133 requires expeditious use in flaw detection, but its high radioactivity permits useful images to be obtained from treated objects in exposure times of one minute or less. Xenon-133 is used routinely in medical nuclear diagnostic imaging and is commercially available with express delivery from Cryogenic Rare Gases, Hanahan, S.C., USA.

Figure 2:
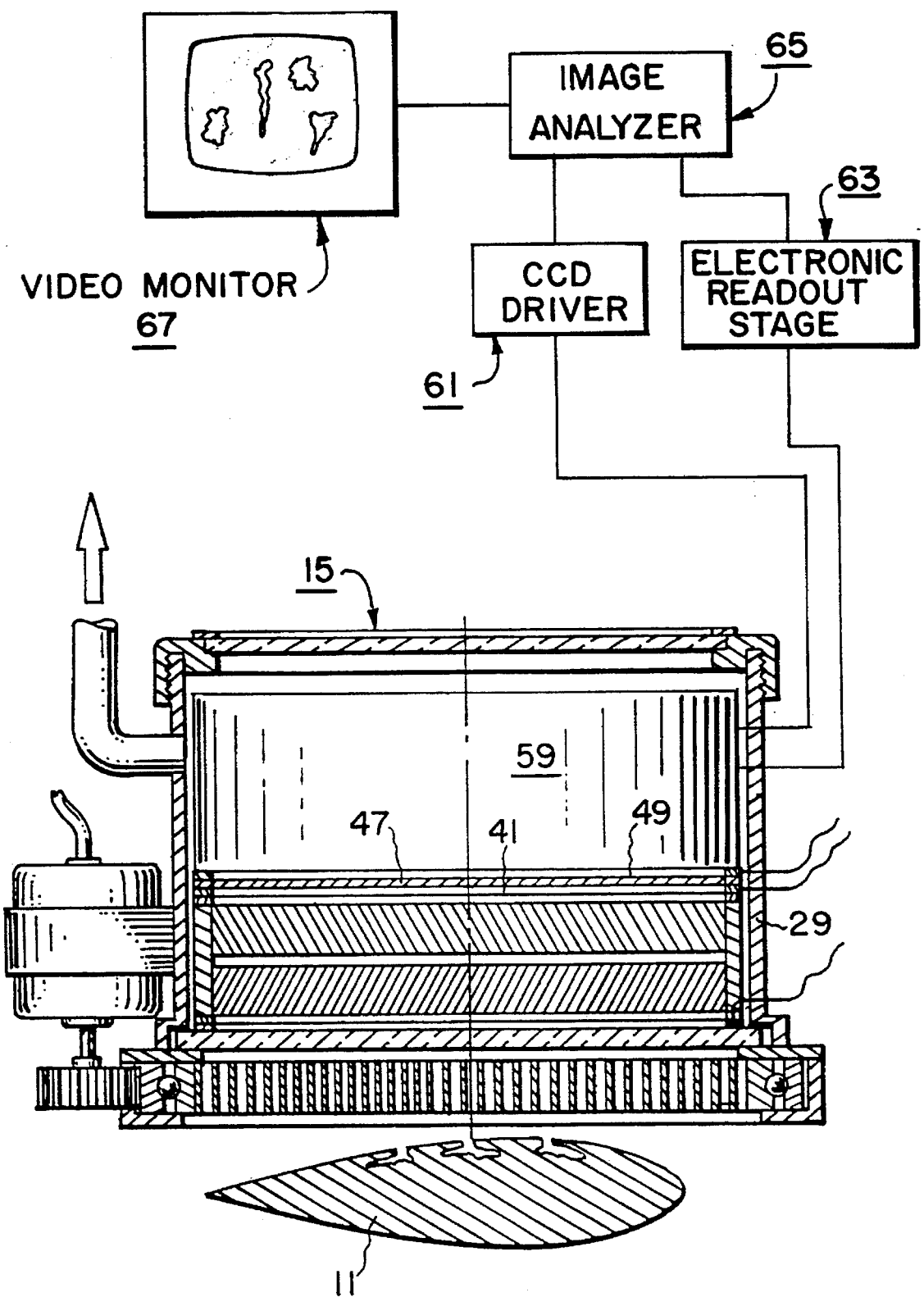
FIG. 2 is a side view similar to FIG. 1 but with a charge-coupled device installed in the housing to digitize the image on the phosphor-coated plate, and with computerized image analysis elements replacing the camera of FIG. 1.

In FIG. 2 a charge-coupled device (CCD) 59 is shown installed within housing 29 immediately above phosphor plate 47. CCD 59 collects output light from the fluorescent image of blade 11 on phosphor plate 47 and provides a two-dimensional, digitized array of that image. Such CCD's are conventional. CCD 59 is controlled by driver unit 61, shown schematically in FIG. 2. Driver unit 61 applies appropriate voltage signals to electrodes within CCD 59 whereby the accumulated photocharges in each pixel of CCD 59 can be transferred sequentially to an electronic readout stage 63, shown schematically in FIG. 2 at which stage the photocharge is converted to a proportional voltage signal. This is in turn amplified and modified to give an output video signal which is transmitted to a digital (computer) image analyzer 65 which also receives a timing signal from CCD driver unit 61. The analyzed image information can be displayed on a video monitor 67, or printed out or stored (not shown).

CCD 59 is a video CCD, of the type used in video cameras. A suitable CCD for this purpose is Model SSC-05 available from Sony Component Products, Co., Image Sensing Division, Los Angeles, Calif., USA. A limitation on the sensitivity of a CCD is the level of dark current present in the device at ambient temperatures, dark current being a noise signal, generated in the absence of any input, which lowers the signal-to-noise ratio and thereby reduces the sensitivity of the device to low-level signals. If maximum sensitivity is required, this limitation can be overcome through an alternative design of CCD in which the collection system is cooled to as low as −140° C., virtually eliminating generation of dark current.

Figure 3:
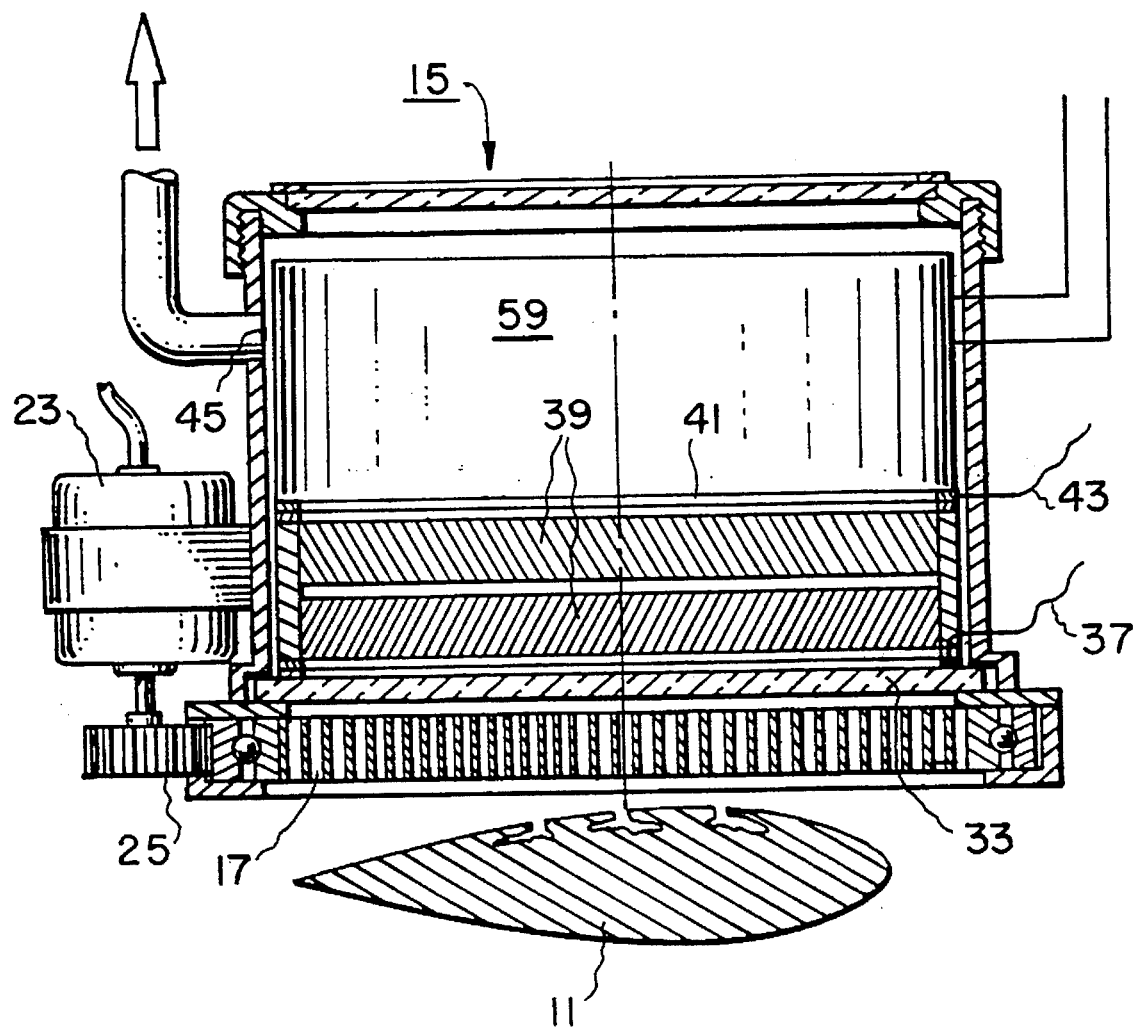
FIG. 3 is a side view similar to FIG. 2, but with the phosphor-coated plate removed, allowing the multiplied photoelectron virtual image to be digitized directly by a charge-coupled device, and with the image analysis means omitted for simplicity.

In FIG. 3, plate 47 has been removed, along with second anode 49 and lead 51, and CCD 59 is installed immediately above and insulated from first anode 41. The multiplied photoelectron image emerging from MCP 39 is captured and digitized directly by CCD 59. CCD control and image analysis (not shown) are identical with those of FIG. 2. Direct conversion of the multiplied photoelectron image, rather than indirect conversion via electrons-to-light-to-electrons, is possible with the system of FIG. 3.

Figure 6:
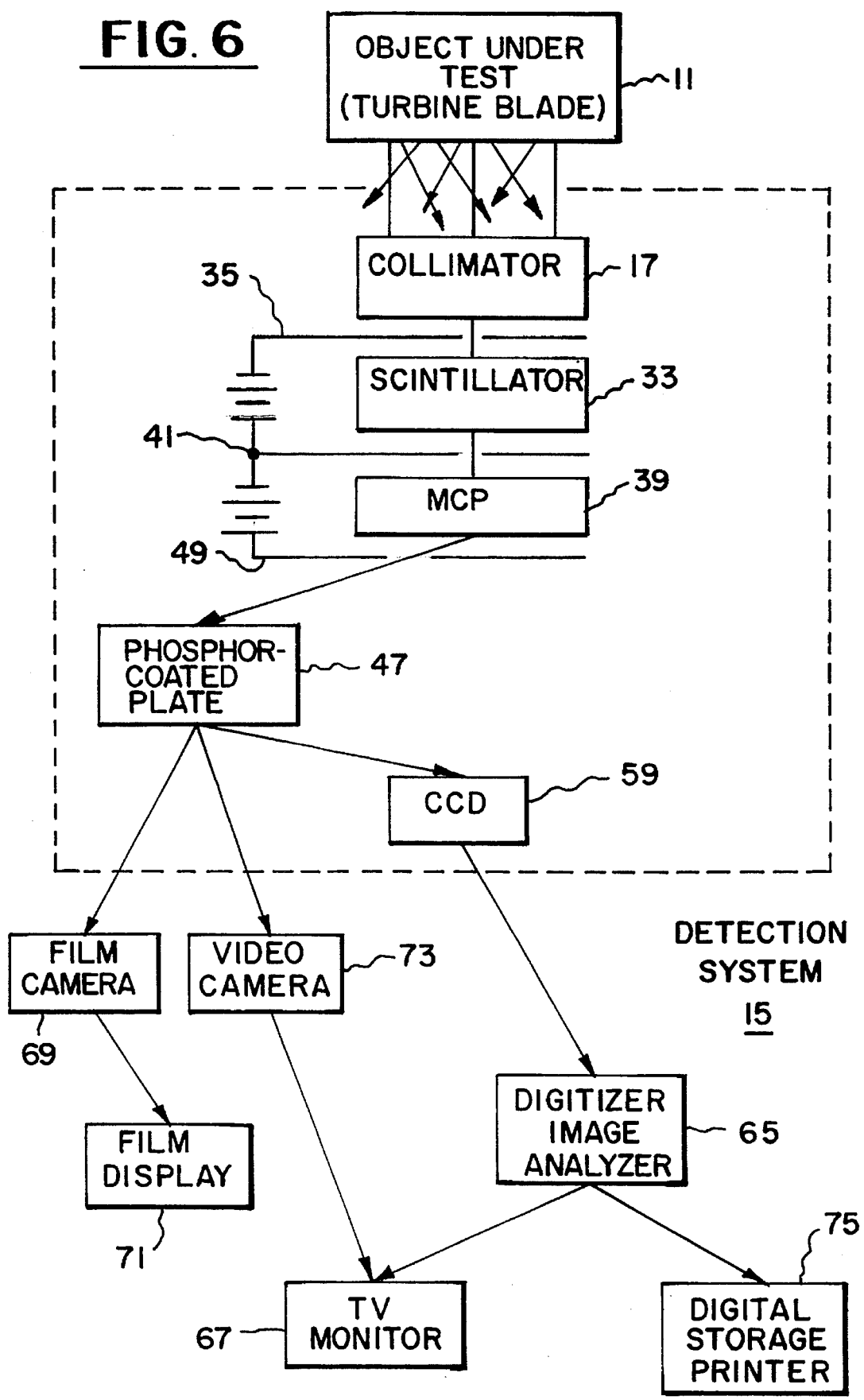
FIG. 6 is a block diagram schematically illustrating the system of the invention and showing the flow of data through the system.

The system operates as depicted in FIG. 6. Blade 11 is first treated with xenon-133 gas by first cleaning the blade with a low-boiling solvent to remove any surface contaminants and then subjecting it to vacuum conditions sufficient to degas any flaws in the surface, for example, a pressure of $10^{-3}$ Torr for one hour. Blade 11 is then subjected to an atmosphere comprising not less than 5% xenon-133 at a pressure of about 3 atmospheres and a temperature of about 200° F. for about one day. Blade 11 is then removed from the radioactive atmosphere and presented for defect analysis.

Blade 11 gives off gamma photons in various directions from the decaying xenon-133 in flaws 13, as shown schematically in FIG. 6. The dotted box encloses the components for detection which function as described hereinabove. The multiplied photoelectron virtual image emanating from MCP 39 can be imaged on phosphor-coated plate 47 or digitized directly by CCD 59. The visible image on phosphor plate 47 can be viewed directly by a viewer (not shown), or it can be photographed on film 69 and displayed off-line by projection of transparencies or printing 71, or it can be photographed by video camera 73 and displayed on video (TV) monitor 67 or transmitted to digital (computer) image analyzer 65. Alternatively, an image emanating from MCP 39 and digitized directly by CCD 59 can be transmitted directly to image analyzer 65. The information output of analyzer 65 can be displayed on video monitor 67 or stored or printed 75.

From the foregoing description, it will be apparent that there has been provided an improved system for radiogenic detection of microscopic flaws in objects such as turbine blades. Variations and modifications in the system and its components herein described, and additional uses and applications therefor, within the scope of the invention, will undoubtedly suggest themselves to those skilled in the art. Accordingly, the foregoing description should be taken as illustrative and not in a limiting sense.

What is claimed is:

1. Apparatus for detecting flaws in an article treated with radioactive gas, which article radiates gamma photons from such flaws, comprising:
   a. means for collimating said radiating gamma photon radiation to restrict detection to those photons travelling in a certain direction to create a gamma photon virtual image of said flaws;
   b. scintillation means for absorbing said gamma photons and directly emitting photoelectrons from the gamma photons absorbed to convert said gamma photon virtual image directly into a photoelectron virtual image containing electrons representing the gamma photon image;
   c. means for multiplying the number of electrons carrying said photoelectron virtual image; and
   d. means for converting said multiplied photoelectron virtual image into output information relatable to said flaws in said article.

2. The apparatus of claim 1 wherein said means for multiplying increases said number of electrons by a factor of at least $10^5$.

3. The apparatus of claim 1 wherein said means for multiplying comprises a microchannel plate.

4. The apparatus of claim 1 wherein said radioactive gas is xenon-133.

5. The apparatus of claim 1 wherein said collimating means comprises a parallel-hole lead plate.

6. The apparatus of claim 5 further comprising a housing which is substantially opaque to cosmic radiation.

7. The apparatus of claim 6 wherein said parallel-hole lead plate is circular and is rotatably mounted on said housing.

8. The apparatus of claim 1 wherein said scintillation means comprises quartz, sodium iodide or polystyrene.

9. The apparatus of claim 1 wherein said means for converting said multiplied photoelectron virtual image comprises a phosphor-coated plate.

10. The apparatus of claim 1 wherein said means for converting said multiplied photoelectron virtual image comprises a charge-coupled device.

11. Apparatus for detecting flaws in an article treated with xenon-133 gas, which article radiates gamma photons from decay of said gas in said flaws, comprising:
   a) a parallel-hole lead collimator to create a gamma particle virtual image of said flaws;
   b) a scintillation plate comprising quartz for converting said gamma particle virtual image directly into a photo electron virtual image;
   c) a microchannel plate system for multiplying the number of electrons in said photo electron virtual image by a factor sufficient for electro-optical conversion of said photo electron virtual image into a visible image; and
   d) a phosphor-coated plate for converting said multiplied electron virtual image into a visible image of said flaws in said treated article.

12. The apparatus of claim 11 further comprising a sealed housing for said microchannel plate system.

13. The apparatus of claim 12 further comprising means for establishing and maintaining a pressure of down to $10^{-7}$ Torr within said sealed housing.

14. The apparatus of claim 11 further comprising means for establishing an electromagnetic field around said scintillator to accelerate electrons therefrom toward said microchannel plate system.

15. The apparatus of claim 14 further comprising means for establishing an electromagnetic field around said microchannel plate system sufficient to cause said microchannel plate system to multiply the number of said electrons reaching it from said scintillator by a factor of at least $10^5$.

16. The apparatus of claim 11 further comprising a video camera for photographing said visible image displayed on said phosphor-coated plate.

17. The apparatus of claim 11 further comprising a charge-coupled device for digitizing said visible image displayed on said phosphor-coated plate.

18. The apparatus of claim 17 further comprising means for computer analysis of said digitized image of said flaws.

19. A method for detecting flaws in an article treated with radioactive gas which radiates atomic photons from said flaws, comprising the steps of:
    a) collimating said radiating atomic photons to restrict detection to those photons travelling in a certain direction to form an atomic particle virtual image of said flaws;
    b) converting said atomic photon virtual image directly into a photoelectron virtual image of said flaws by phosphor-free means;
    c) multiplying the number of electrons carrying said photoelectron virtual image; and
    d) converting said multiplied photoelectron virtual image into output information relatable to said flaws in said article.

20. The method of claim 19 wherein said output information comprises a visible image on a phosphor-coated plate.

21. The method of claim 20 further comprising the step of digitizing said visible image after said step of converting said multiplied photoelectron virtual image into said visible image.

22. The method of claim 21 wherein said digitizing step is carried out with the aid of a charge-coupled device.

23. The method of claim 19 wherein said output information comprises digitized image data suitable for computerized image analysis.

24. The method of claim 23 wherein said digitizing of said output information is carried out with the aid of a charge-coupled device.

25. The method of claim 19 wherein said multiplying step is carried out with the aid of a microchannel plate.

26. The method of claim 19 wherein said multiplying step produces a multiplication of the number of said electrons by a factor of at least $10^5$.

27. The method of claim 19 wherein said collimation of said radiating atomic photons is carried out with the aid of a rotating parallel-hole collimator.

28. The method of claim 19 wherein said radioactive gas is xenon-133.

29. A method for detecting flaws in an article, comprising the steps of:
    a) subjecting said flawed article to conditions comprising an atmosphere containing a radioactive gas at a temperature of at least about 200 degrees F. and at a pressure above about 2 atmospheres for at least about 1 day;
    b) removing said article from said subjecting conditions;
    c) collimating atomic photons radiating from said article to restrict detection to those photons travelling in a certain direction to form an atomic photon virtual image of said flaws;
    d) converting said atomic photon virtual image directly into a photoelectron virtual image of said flaws by phosphor-free means;
    e) multiplying the electrons carrying said photoelectron virtual image; and
    f) converting said multiplied photoelectron virtual image into output information relatable to said flaws in said article.

30. The method of claim 29 wherein said output information comprises a visible image on a phosphor-coated plate.

31. The method of claim 30 further comprising the step of digitizing said visible image after said step of converting said multiplied photoelectron virtual image into said visible image.

32. The method of claim 29 wherein said output information comprises digitized image information suitable to digitized image analysis.

33. The method of claim 29 wherein said radioactive gas is xenon-133.

* * * * *